US005454048A

United States Patent [19]
Davis

[11] Patent Number: 5,454,048
[45] Date of Patent: Sep. 26, 1995

[54] APPARATUS FOR MULTIPLEXED IMAGING USING OPTICALLY-GENERATED KRONECKER PRODUCTS

[75] Inventor: David S. Davis, Monterey, Calif.

[73] Assignee: The United States of America as represented by the Secretary of the Navy, Washington, D.C.

[21] Appl. No.: 973,099

[22] Filed: Nov. 6, 1992

[51] Int. Cl.$^6$ ................................ G06K 9/00; G06F 7/36
[52] U.S. Cl. .......................... 382/281; 356/310; 359/107; 364/727
[58] Field of Search ............................... 382/43; 356/310, 356/330, 346; 359/115, 127, 138, 559, 565, 107; 364/727

[56] References Cited

U.S. PATENT DOCUMENTS

| | | | |
|---|---|---|---|
| 4,005,385 | 1/1977 | Joynson et al. | 382/43 |
| 4,460,969 | 7/1984 | Chen et al. | 382/43 |
| 4,615,619 | 10/1986 | Fateley | 356/310 |

OTHER PUBLICATIONS

Sloane et al. "Codes for Multiplex Spectrometry" Applied Optics 8 (10), pp. 2103–2106 (1969).
Davis et al. "Infrared Fourier spectrometer for airborne and ground–based astronomy" Applied Optics 19 (24), pp. 4138–4155 (1980).
Harmuth "Sequency Theory" Academic Press New York 1977.
Guenther "Modern Optics" John Wiley & Sons New York 1990.
Vanasse "Spectrometric Techniques" Academic Press New York 1977 Chapter 5, "Hadamard–Transform Spectroscopy" pp. 189–207.
Davis et al, "Airborne Observations Of The Orion Molecular Hydrogen Emission Spectrum," Ap. J. 259:166–179 (1982).
Davis et al, "Velocity–Resolved Observations Of Water In Comet Halley," Ap. J. 309:L95–L99 (1986).
Larson et al, "$H_2$ Spectroscopy As An Agent For Extinction Determinations: The Near–Infrared Curve For The Orion Molecular Cloud," Ap. J. (Letters), 304:481–489, (1986).
Welch, "Imaging by convergent tiling," Computers in Physics 4, 645–649 (1990).
Kadin et al, "Photofluxonic Detection: A new mechanism for infrared detection in superconducting thin films," Appl. Phys. Lett. 57(26), pp. 2847–2849, 24 Dec. 1990.

Primary Examiner—Leo H. Boudreau
Attorney, Agent, or Firm—Stephen J. Church; Melvin J. Sliwka; John L. Forrest, Jr.

[57] ABSTRACT

A new type of fully-multiplexed imaging device is described for use at wavelengths where efficient focal plane array detectors are unavailable. It shares some properties in common with the familiar technique of cycle-redundancy (i.e. Hadamard transform) imaging, but many of its features and capabilities are unique. Some of these characteristics are, first, the new approach employs image encoding masks that are both transmitting and reflecting, thereby increasing optical efficiency, and second, the technique requires only $2\sqrt{N}$ encoding masks to image a field of N pixels, a dramatically smaller number than that needed (~2N) by traditional methods. Dual complementary inputs are used for first-order passive rejection of radiation background interference. The resulting image spatial resolutions along two coordinate directions are completely independent of each other. The measured image is formed by a convergent tiling of the image plane, quite unlike conventional raster scanning. In principle, the technique is capable of versatile adaptation to a wide variety of imaging and target discrimination tasks in infrared and microwave remote sensing, astronomy and surveillance.

20 Claims, 11 Drawing Sheets

Prior Art
FIGURE 1

| 0 | 1 | 2 | 3 |
|---|---|---|---|
| 4 | 5 | 6 | 7 |
| 8 | 9 | 10 | 11 |
| 12 | 13 | 14 | 15 |

Prior Art

APPARATUS FOR MULTIPLEXED IMAGING USING OPTICALLY-GENERATED KRONECKER PRODUCTS

FIELD OF THE INVENTION

This invention pertains to a method and apparatus for imaging in the infrared through microwave bands.

BACKGROUND OF THE INVENTION

Techniques and apparatus for producing images at some wavelengths are lacking. The widespread successes of Fourier Transform Spectroscopy (FTS) methods in producing detailed spectra of weak sources are well known. [(See: Vanesse, G., ed. "Spectrometric Techniques I", Academic Press, New York (1977); Davis et al, Appl. Optics, 19, 4138–4155 (1980); Davis et al, Ap.J. 259, 166–179 (1982); Davis et al, Ap.J. 309, L95–L99 (1986); Larson et al, Ap. J. (Letters), 304, 481–489 (1986)] These successes have provided a stimulus for this effort to extend some of the advantages of the multiplexed FTS approach into the domains of imaging and imaging spectroscopy.

Prior art imaging devices using pixel-forming masks have not had high optical efficiency or have required large numbers of masks thereby reducing their usefulness.

OBJECTIVES OF THE INVENTION

It is therefore a primary objective of the present invention to provide a new method and apparatus for imaging at wavelengths for which efficient array detector technology is lacking.

SUMMARY OF THE INVENTION

These objects of the invention and other objects, features and advantages to become apparent as the specification progresses are accomplished by the invention according to which, briefly stated, an image is formed on a mask of a first set which reflects in part and transmits in part according to a pattern of sequency functions, the reflected and transmitted parts are focussed on a mask of a second patterned on orthogonal sequency functions orthogonal to the first set and the resulting reflected and transmitted beams are detected with two discrete detectors and processed by computer to form an image of pixels.

LIST OF ADVANTAGES OF THE INVENTION

An important advantage of the present invention is the employment of image encoding masks that are both transmitting and reflecting, thereby increasing optical efficiency.

Another advantage is the requirement of only $2\sqrt{N}$ encoding masks to image a field of N pixels, a dramatically smaller number than that needed (~2N) by traditional methods.

A further advantage is the use of dual complementary inputs for first-order passive rejection of radiation background interference.

The resulting image spatial resolutions along two coordinate directions are completely independent of each other.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

Lexicon

The are two quite distinct meanings for the term multiplexing in popular usage. The original definition applies to systems in which multiple signals are encoded simultaneously onto a single information channel. A more recent, but pervasive, usage pertains to electrically scanned, or switched, systems in which separate signals sequentially share a single channel in time-sliced fashion, but with only one signal present on the channel at any particular time. The former definition is the one of interest here. Consequently, a multiplexed image is one in which all of the radiant energy associated with all (or at least most) image pixels is detected continuously and is encoded simultaneously onto one, or at most a few, detector channels.

Glossary

The following is a glossary of elements and structural members as referenced and employed in the present invention.

10—conventional multiple imaging apparatus of the prior art
12—incoming light
14—telescope objective
16—mask
18—collection lens
20—discrete detector
22—telescope
24—image plane for the mask
26, 28—collection lenses
30, 32—matched discrete radiation detectors
34—difference amplifier
40—telescope
42—image plane of the first mask
44, 46—concave mirrors
48—image plane of the second mask
50, 52—collection lenses
54, 56—matched discrete radiation detectors 58—difference amplifier
102—light beams from telescope
104, 106—injection mirrors
108, 110, 112, 114, 116, 118—concave mirrors
120—chopper
122, 124—masks
126, 128—collection lenses
130, 132—detectors
134—difference amplifier
140—disk with chopper
142, 144—disks with masks
146—servomotors for disks
152, 154—other masks on disks
160—computer
162—data to computer
164—image
166—control signals from computer
180—slats forming masks
182—narrow ends of slats
184—pivots on narrow ends
186—servomotors for slats.

DESCRIPTION OF THE PREFERRED EMBODIMENTS

Assume that we have a simple optical system consisting of some target object, a perfect lens which images the target onto an image plane, and another perfect lens that focuses the energy from the image plane onto a single detector, with no loss of energy anywhere within the system. Let P be the radiant flux at the detector and E be the irradiance at the image plane. Furthermore, assume that the image lies entirely within some bounded area A on the image plane. In general, for an image with non-uniform irradiance, E will be a function of the spatial coordinates, say x and y that specify locations on the image plane. Hence, $$P = \int_A E(x,y) dx dy.$$

Figure 1:
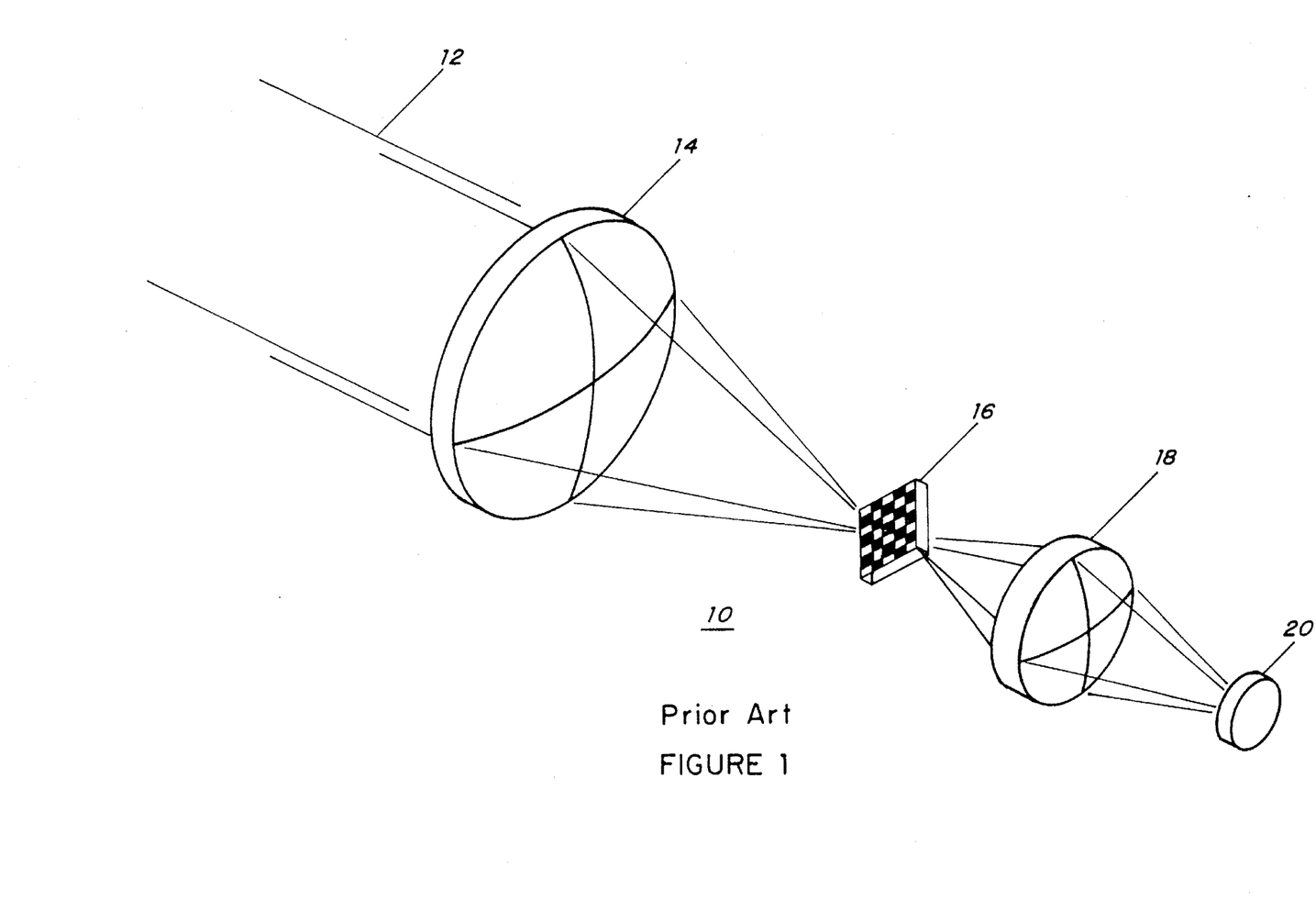
FIG. 1 shows a schematic diagram of conventional multiplexed imaging of the prior art.

Such an imaging apparatus 10 as known in the prior art is shown in FIG. 1 where incoming radiation 12 is collected by a telescope objective 14, focussed through a mask 16, to a collection lens 18 and discrete detector 20. If we insert a modulation mask 16 into the image plane, as shown in FIG. 1, the detected flux will be modified accordingly, as $$P = \int_A E(x,y) \mu(x,y) dx dy,$$

where we define the multiplexing, or mask, function $\mu(x,y)$ so that it represents the fraction of the incident power that is transmitted through the image point (x,y). Clearly, the values of $\mu$ are constrained to the range $0 \leq \mu(x,y) \leq 1$ when an encoding scheme like the one in FIG. 1 is used. The goal of multiplexed imaging is the efficient encoding of an image irradiance function E(x,y) onto a single detector channel in such a way that it may be decoded unambiguously from a set of measurements of P. This procedure cannot work if only a single encoding mask and unique P are employed. In a practical situation, a sequence of different masks $\mu_i(x,y)$, $\{i=0, \ldots, M-1\}$ must be used, resulting in a sequence of flux measurements $P_i$. In such a circumstance we have $$P_i = \int_A E(x,y) \mu_i(x,y) dx dy. \tag{1}$$

From the form of this expression, it is apparent that the detected flux is a two-dimensional integral transform of the irradiance function. The image modulation produced by the sequence of encoding masks generates this transform by purely optical means. One recovers the desired E(x,y) by measuring a sufficient number of $P_i$ so that the transform may be inverted. Obviously, there are constraints that the $\mu_i(x,y)$ must satisfy if the transform (1) is to have an inverse.

Of particular interest for our discussions here are $\mu_i(x,y)$ that assume constant values over subdomains of the image region A (although R may vary from subdomain to subdomain). That is, we stipulate that A may be geometrically subdivided into, and completely tiled by, a set of subdomains $A_j$, $\{j=0, \ldots, N-1\}$, so that each $A_j$ on the i-th encoding mask is associated with a constant $\mu_{ij}$. The image plane is thereby rendered as a mosaic composed of the tiles $A_j$, with each $A_j$ corresponding to a single image element, or pixel. The flux integral (1) then becomes a simple composite sum of integrals over the individual $A_j$:

$$P_i = \int_{A_0} E(x,y) \mu_{i0}(x,y) dx dy + \ldots + \int_{A_{N-1}} E(x,y) \mu_{i(N-1)}(x,y) dx dy$$

$$= \sum_{j=0}^{N-1} \int_{A_j} E(x,y) \mu_{ij}(x,y) dx dy.$$

Since $\mu$ assumes a constant value $\mu_{ij}$ over any given $A_j$, it follows that $$P_i = \sum_{j=0}^{N-1} \mu_{ij} \int_{A_j} E(x,y) dx dy. \tag{2}$$

The areal integral $$\int_{A_j} E(x,y) dx dy = \phi_j = \bar{E}_j A_j \tag{3}$$

is just the radiative flux $\phi_j$ at the j-th pixel, and $\bar{E}_j$ is the mean pixel irradiance. Hence, equation (2) becomes $$P_i = \sum_{j=0}^{N-1} \mu_{ij} \phi_j, \quad \{i=0, \ldots, M-1\}. \tag{4}$$

Expression (4) represents a linear system of N equations relating the detected fluxes $P_i$ and the pixel fluxes $\phi_j$. In matrix form, it is written as $$\hat{P} = \hat{\mu} \hat{\phi} \tag{5}$$

where the carat symbol signifies a matrix. Equations (4) and (5) define a discrete, sampled transform corresponding to the continuous integral transform of equation (1). Inversion of this transform permits recovery of the average irradiances $\bar{E}_j$ from a set of M discrete flux measurements $P_i$, via a two-step process. First, provided that the multiplexing matrix has an inverse $\hat{\mu}^{-1}$, multiplication of both sides of equation (5) by $\hat{\mu}^{-1}$ yields an expression for the pixel fluxes $\phi$:

$$\hat{\phi} = \hat{\mu}^{-1} \hat{P}. \quad (6)$$

Second, equation (3) is used to calculate the desired average pixel irradiances $$\bar{E}_j = \phi_j / A_j. \quad (7)$$

In order for $\hat{\mu}^{-1}$ to exist, $\mu$ must be both square and non-singular. This mandates that M=N and that $\hat{\mu}$ have rows and columns that are linearly independent. Although not strictly required by the mathematics, matrix orthogonality is also a desirable characteristic. The use of orthogonal basis functions in multiplexing applications yields significant benefits, particularly when statistical properties, such as experimental signal-to-noise characteristics are of interest.

There are several families of functions that one can utilize in the implementation of image multiplexing schemes of this type. Perhaps the most familiar are the cyclically-redundant forms associated with Hadamard transform (HTS)spectroscopy. [See: Decker in Vanesse, ed. "Spectrometric Techniques I, Academic Press, New York (1977)]. In the HTS technique, sets of slotted masks with opaque ($\mu_{ij}=0$) and transparent ($\mu_{ij}=1$) pixels are used in a one-dimensional paradigm of the encoding scheme described above. Because of the nature of the masks, HTS and similar methods require redundant mask sets, typically with 2N members, to encode N pixels.

The novel imaging technique disclosed here is based upon the branch of applied mathematics known as sequency theory. [See: Harmuth, H. F., "Sequence Theory Foundations and Applications," Academic Press, London (1984)] The basis functions chosen for construction of the encoding masks are the familiar Walsh functions and their associated Walsh matrices. The use of Walsh sequency methods in optical encoding and signal multiplexing schemes is not new [Bass, C. A., ed., "Applications of Walsh Functions, 1970 Symposium and Workshop," NTIS AD-707431, U.S. Government Printing Office, Washington D.C. (1970); Zeek et al, ed., "Applications of Walsh Functions, 1972 Symposium," NTIS AD-744650, U.S. Government printing Office, Washington D.C. (1972)] However, we believe that our approach to image multiplexing is a unique contribution to the field. This section first outlines some of the relevant background material; then it describes the new technique itself.

Recall some fundamental properties of the Walsh functions. They assume only the values $\pm 1$. Furthermore, they comprise a complete, orthogonal basis set, provided that the domain of their definition is subdivided into $2^k$ subdomains, where k is a positive integer. For our purposes, $N=2^k$ is called the order of the set of functions and the associated matrix. The sequencies of the Walsh functions range from 0 to N−1. The concept of sequency is merely a generalization of the conventional idea of frequency. It is inappropriate to refer to the frequencies of the Walsh functions, because many of them are not periodic. A particular function's sequency is the number of zero crossings that the function executes over its entire domain of definition. To construct the Walsh row matrix associated with a particular function, one simply notes the function's value within each subdomain, and places that value into the corresponding matrix entry. When the complete set of N Walsh row matrices in a basis are stacked up, they constitute the square orthogonal Walsh matrix, $\hat{W}$, of order $N=2^k$.

The Walsh matrices can be used to multiplex images in a straightforward manner. The image plane is subdivided into $N=2^k$ tiles, corresponding to the $A_j$ in equation (2). The j-th tile of the i-th encoding mask is assigned $\mu_{ij}=W_{ij}$. A problem arises at this juncture. The conventional scheme illustrated in FIG. 1 requires that $\mu_{ij}$ be either 1 or 0; there is no provision for $\mu_{ij}=-1$. The way around this difficulty is to introduce mask redundancy, just as is done with HTS-type systems. It is necessary to employ two complementary sets containing N masks each, one set with $\mu_{ij}=(W_{ij}+1)/2$, the with $\mu_{ij}=(1-W_{ij})/2$. After the Pi (see equation (4)) are measured for each of the 2N masks, pairs of measurements from complementary masks are subtracted to yield a difference set containing N new P's That set may then be transformed to yield the pixel irradiances, as outlined in equations (6) and (7).

The prior art approach to multiplex imaging (i.e. Hadamard, cyclic redundancy etc) is shown by example here. Any of the sequency function families (Hadamard, Walsh, etc) could be used here to the same ends. Is this example, the sequency-ordered, positive phase Walsh functions are used so that later comparison with the new technique can be drawn more easily. Keep in mind, though, that the ordering is arbitrary, both here and in succeeding examples. In FIG. 1, the single discrete detector is incapable of telling which portion of the radiation passed through which portion of the image plane 16. It's output voltage or current is proportional only to the total radiative power P coming from the image.

Suppose that we wish to parse the image plane into subregions so that we can measure unambiguously how much power comes from each subregion, while having at our disposal only the aforementioned discrete detector. We could do a pixel-by-pixel scan of the image, perhaps using rotating mirrors as is done is a raster scan system, but this is very wasteful of precious radiation energy because they look at only one pixel at a time and let radiation from all other pixels be lost while doing so. The original Hadamard and cyclic redundancy schemes developed a way to increase the efficiency of such a system to about 50% by using a sequence of opaque and transmitting masks in the image plane, Each mask is held stationary in the image plane for a fixed period, then the next one is swapped in, and so forth. Sliding glass plates with photographically-produced masks, rotating disks containing the masks, and liquid crystal panels which are optically switched to yield masks, are examples of the ways this has been accomplished.

Figure 2:
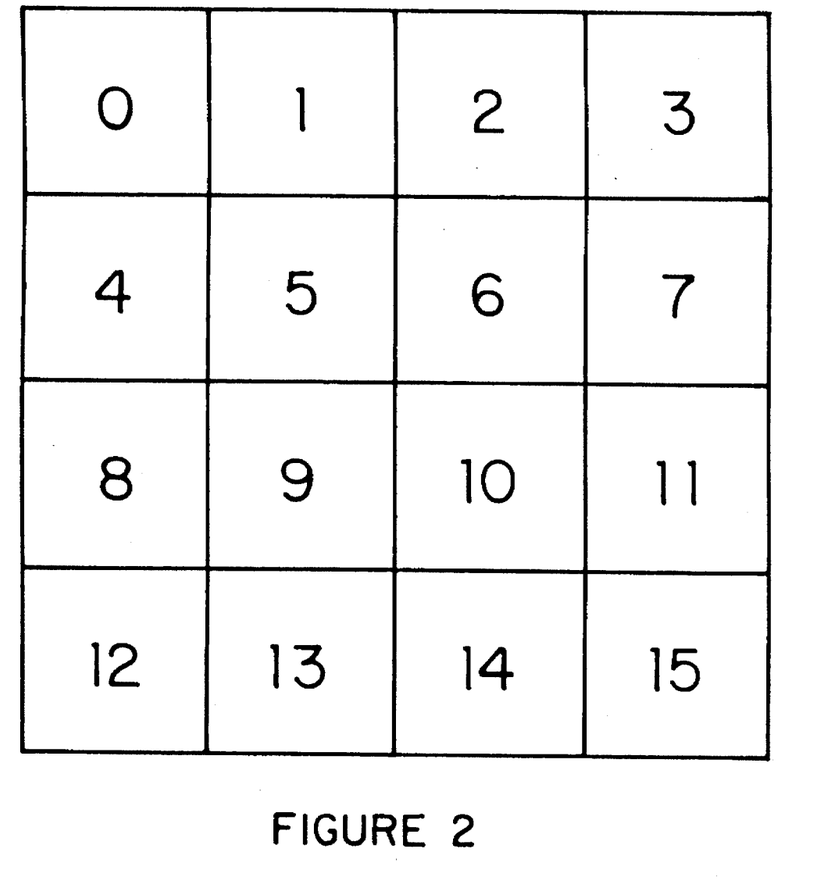
FIG. 2 is a diagram of a image having 4×4 pixels.

Let's assume the image plane of interest is square, containing a 4×4 array of square pixels of equal size as shown in FIG. 2. In FIG. 2 an arbitrary index number has been assigned to each pixel for future reference. Recall from Eqn. 4 that, when we insert the i-th mask into the image plane the detector receives radiated power $P_i$ and $\phi_j$ is the radiative power through the j-th pixel. For a traditional mask with opaque and transmitting pixels, $\mu^{ij}=0$ when the j-th pixel if the i-th mask is opaque and $\mu_{ij}=1$ when the j-th pixel of the i-th mask is transmitting. The desired image is just the set of $\phi_j$. Each mask is swapped in and its $P_i$ measured. Then the matrix equation is inverted (in our case here, via an inverse Walsh transform) to get the $\phi_j$. The inversion is possible only if the $\mu_{ij}$ are restricted to certain functional forms (known as complete orthogonal sets of sequency functions, of which Hadamard, Harr, Walsh, Slant etc. are examples). With opaque and transmitting masks, the math then requires that the number of masks M be twice the number of pixels N, this two-fold factor being the origin of the term "redundant" in the prior art approach. For the example of FIG. 2, 2×16=32 masks are required.

Figure 3:
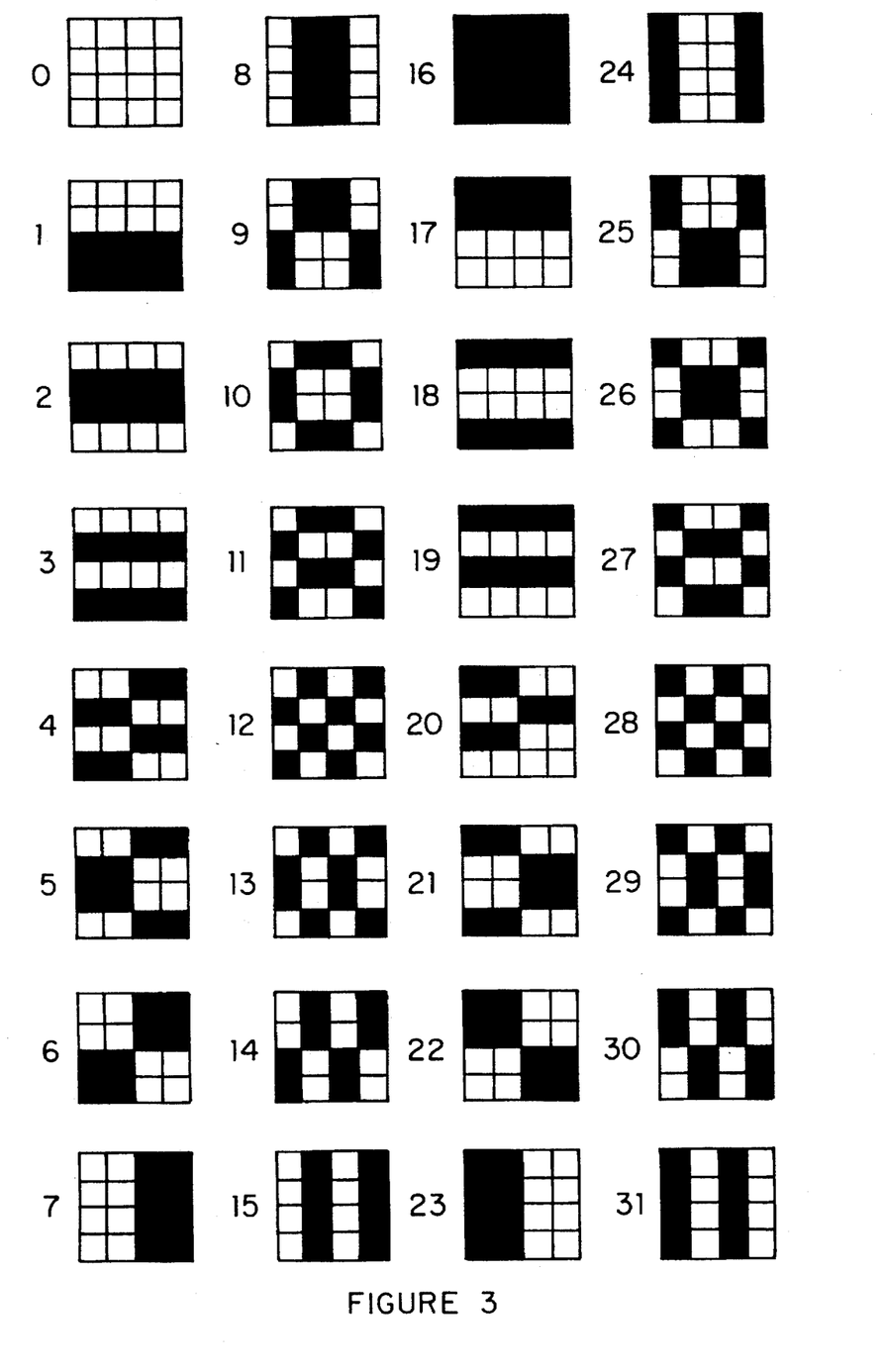
FIG. 3 shows an example of a set of 32 masks required to form the 4×4 image of FIG. 2.

FIG. 3 shows a set of 32 masks which produce 32 $P_i$'s. For example, for mask 1 the $P_i$ is $\phi_0 + \ldots + \phi_7$ and for mask 17 the $P_i$ is $\phi_8+\ldots+\phi_{15}$. Now we form the difference, $P_i'+32$ $P_i-P_{i+16}$. For the example i=1, we thus obtain $P_1=\phi_0+\ldots+\phi_7-\phi_8-\ldots-\phi_{15}$. The $P_i'$ is the sequency-ordered Walsh transform of the $\phi_j$. The $\phi_j$'s are recoverable by performing the inverse Walsh transform for the example shown.

The example shown, while seeming complex, produces an image of only 4×4 pixels, too crude for almost any use. For an imager of practical use, the system should have 64×64= 4096 pixels which in the prior art scheme requires 8192 masks.

Figure 4:
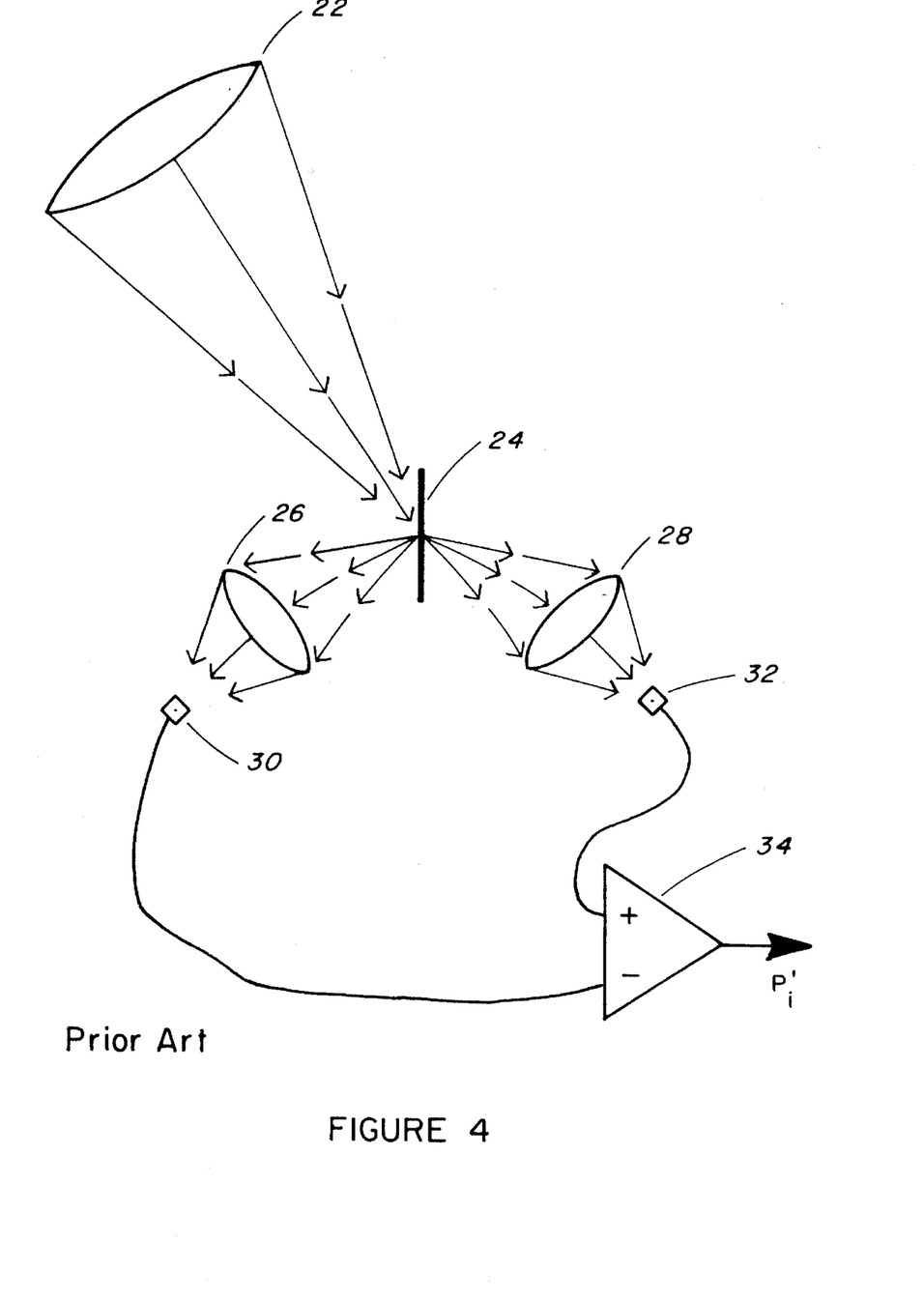
FIG. 4 is a diagram of the reflecting/transmitting mask scheme of the prior art.

In contrast to the redundant procedure discussed above, the new multiplexing approach according to the invention makes use of a potentially more efficient scheme. In essence, we replace the traditional opaque-transparent encoding masks with versions that are reflecting and transparent, as suggested by Sloane et al. [Sloane et al, Appl.Optics 8, 2103–2016 (1969)]. In FIG. 4 The telescope 22 forms an image on the plane 24 of the masks which both transmit and reflect to collection lenses 26, 28 which focus the radiation on matched detectors 30, 32 which are connected to a difference amplifier 34. Let us suppose that we fabricate $M=2^k$ Walsh masks, with reflective pixel regions wherever $W_{ij}=-1$ and transparent pixels wherever $W_{ij}=+1$. We then focus the image of interest onto the mask in the plane 24 from a slightly off-axis direction. (The angle is exaggerated in FIG. 4.) The reflected radiation is sent to one detector 30, while the transmitted radiation goes to another detector 32. Subsequent electronic subtraction in the difference amplifier 34 of the reflected and transmitted signals yields a difference signal in which contributions from reflected pixels are effectively multiplied by −1, while those from transmitted pixels are multiplied by +1. This comprises a precise electro-optical analog to pure Walsh matrix encoding, with $P_i$ as the set of difference signals and $\hat{\mu}=\hat{W}$. Only N masks are needed to encode N pixels, and overall optical efficiency is improved because we no longer waste half of the radiant energy through absorption in opaque mask pixels. An imager of 64×64 pixels would still require 4096 masks, an unmanageable number. There is a trade-off, or course, in the form of increased instrumental complexity. The reflecting-transmitting mask idea is one of the two cornerstones of the new multiplexing scheme.

The other is an elegant consequence of sequency theory itself: a Walsh function of high order may be generated as the Kronecker product of Walsh functions of lower order. The new multiplexing method exploits this property explicitly. The instrument generates, by optical means, the Kronecker product of two simple, low order mask bases. This encodes an image just as though there were a far more complex, higher order mask in the image plane. This is best illustrated by example.

Figure 5:
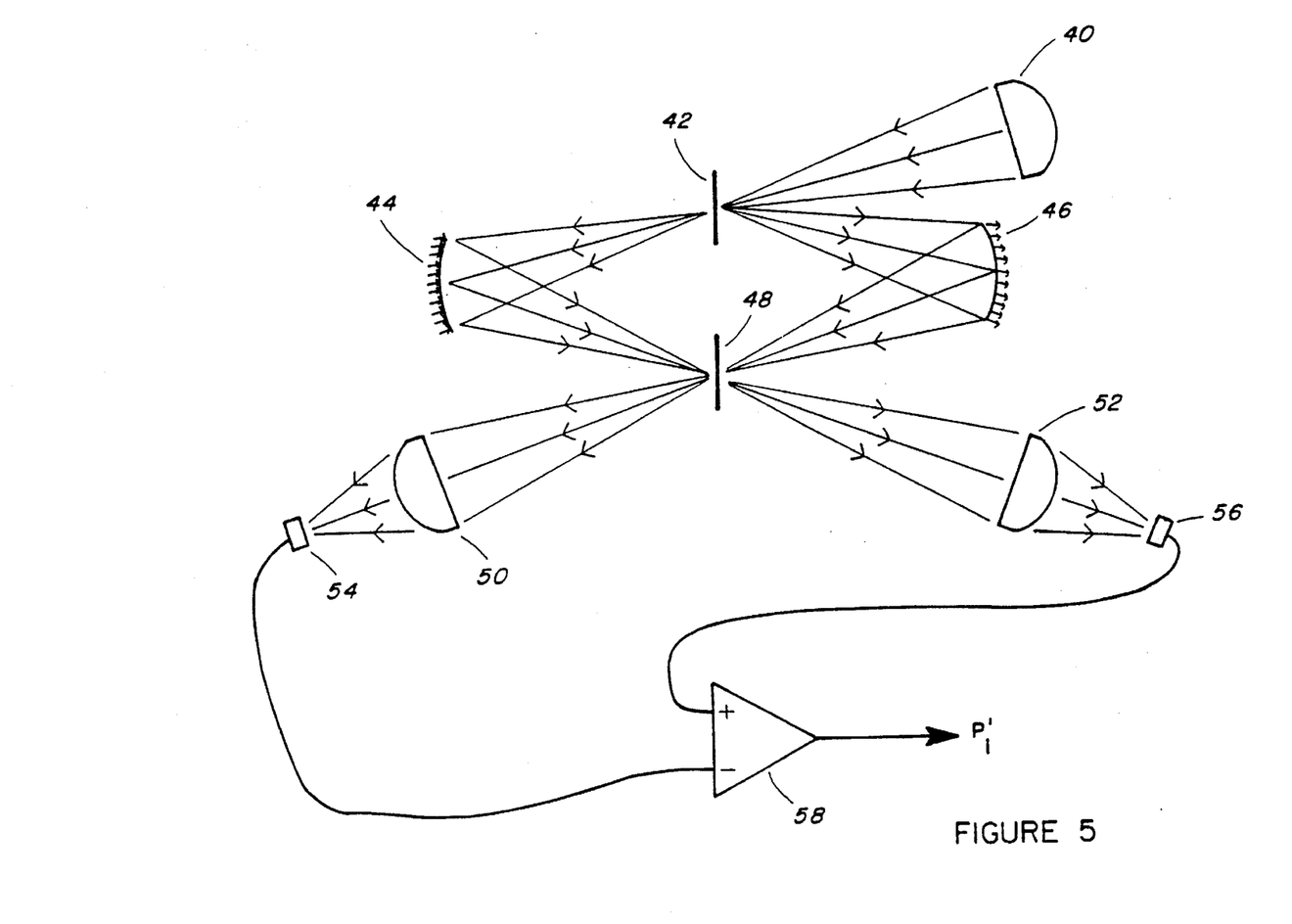
FIG. 5 is a diagram of the simplest embodiment of the imaging apparatus according to the invention.

Consider the device shown in FIG. 5. A telescope 40 focusses an image on the plane 42 of a first mask. The mask plane 42 is located at the focal plane of the telescope but slightly tilted. Concave mirrors 44, 46 focus the transmitted and reflected mask patterns onto a second mask plane 48. The orthogonal mask in the second mask plane 48 then reflects and transmits in turn and the resulting reflected and transmitted light is focussed by lenses 50, 52 on detectors 54, 56. The signals from detectors 54, 56 are combined in difference amplifier 58.

Figure 6:
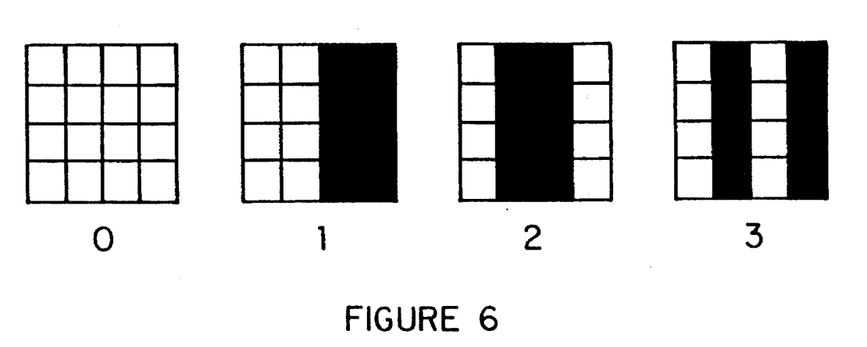
FIG. 6 shows the four masks of the first set for a 4×4 image for the device of FIG. 5.
Figure 7:
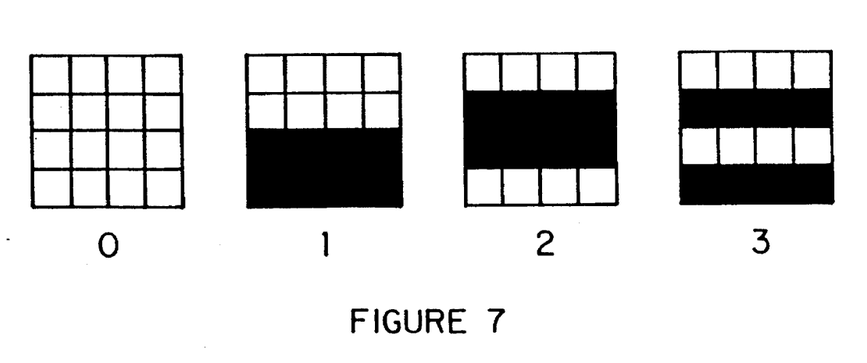
FIG. 7 shows the four masks of the second set for a 4×4 image for the device of FIG. 5.

For a 4×4 pixel example as discussed above for the prior art, this invention now requires only $\sqrt{N}$ masks in each of two sets of masks, i.e. 4 masks in each set. The four mask of the same Walsh set for the first mask position are shown in FIG. 6 and the four masks corresponding masks for the second mask position are shown in FIG. 7.

All masks of the first set are combined with all masks of the second set to produce a result similar to that described above. For example, combining mask 0 of the first set with mask 1 of the second set again gives the same example given for the prior art device $\phi_0+\ldots+\phi_7-\phi_8-\ldots-\phi_{15}$. Similarly, it can be shown that all the $P_i$'s are the same as in the prior art example shown above.

For the 64×64 pixel example discussed above only 128 masks are required while achieving 100% optical efficiency with this invention.

Figure 8:
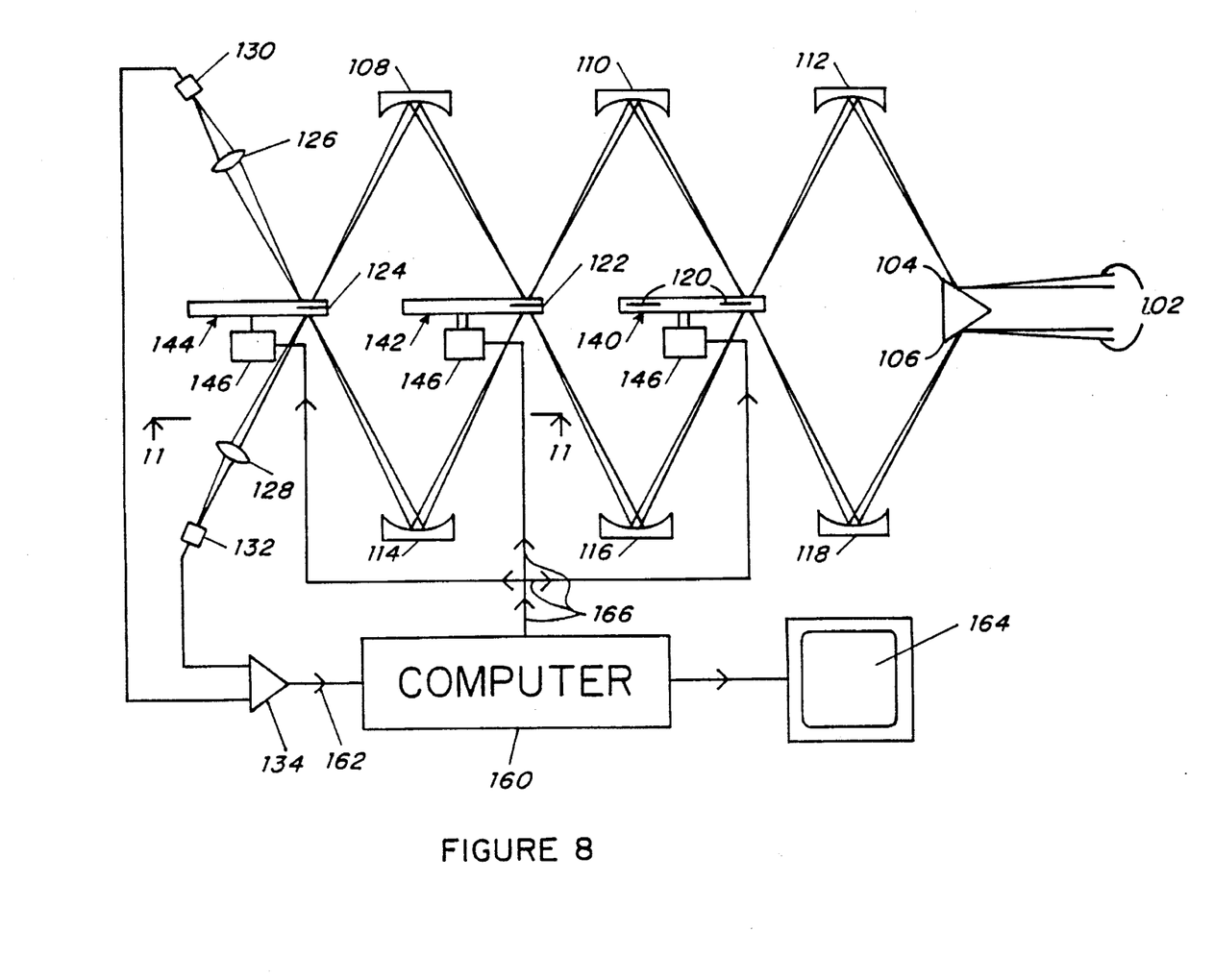
FIG. 8 shows a schematic of the new instrument configuration according to the invention in the preferred embodiment.
Figure 11:
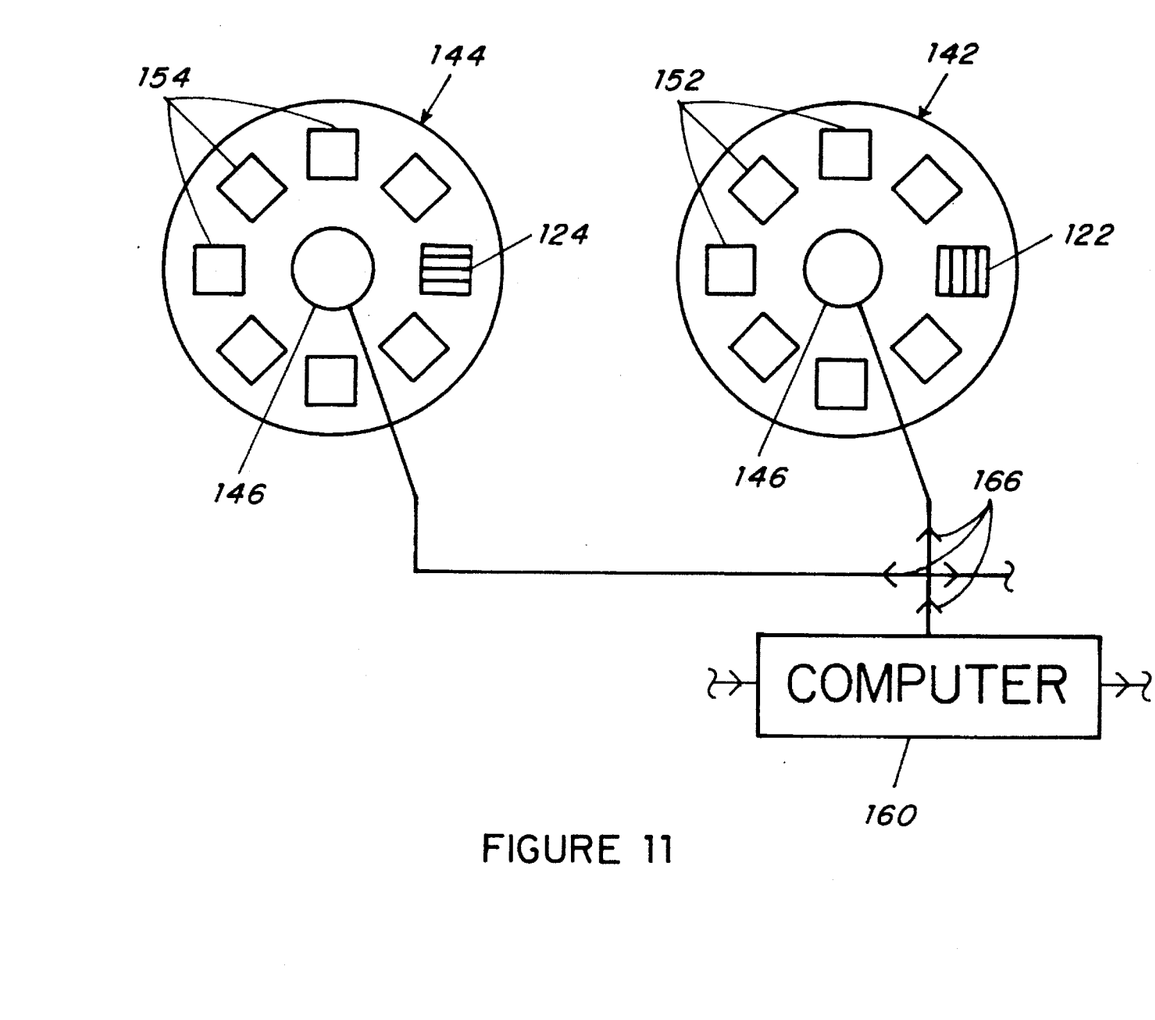
FIG. 11 shows two disks of FIG. 8 from the position of line 11—11 thereof and at an enlarged scale.

Consider the device shown in FIGS. 8 and 11, a more complicated but preferred embodiment of the invention, ignoring for the time being the chopper 120 and one of the two input beams. The instrument is configured around two reflecting-transmitting masks 122, 124. The pixel patterns on one mask 122 consist of one-dimensional Walsh basis functions oriented along some spatial direction. This first mask 122 is reimaged from both sides onto a second reflecting-transmitting mask 124. The second mask 124 contains one-dimensional Walsh basis patterns with their spatial orientations perpendicular to those of the patterns of the first mask 122. The transmitted and reflected beams that exit the second mask are sent to separate detectors 130, 132, and the two detector output signals are differenced, just as was described above. Now consider what will happen when an image is focused upon the first mask 122. The radiation from some pixels will be transmitted, while that from the others will be reflected. A similar process will occur at the second mask 124. Only radiation which was either reflected from both masks 122, 124 or was transmitted by both of them will reach one of the detectors 130, 132. The other detector will sense only radiation that was reflected from one mask and transmitted by the other; the order in which the transmission and reflection occurred is irrelevant. If an observer were to place his eye at one of the detectors, he would perceive the original image as though it were being modulated by a two-dimensional Walsh mask, even though this mask does not exist. This virtual two-dimensional mask is simply a Moiré pattern produced by the two-sided reimaging of the simpler basis masks. The optical reimaging process is isomorphic to the mathematical operation of performing a Kronecker product. One detector sees the image field modulated by the virtual Kronecker product mask, while the other perceives the image modulated by the complement of the virtual mask. When the two detector outputs are differenced, a complete, two dimensional multiplexing system is formed. This results in an enormous reduction in the required number of encoding masks. To multiplex an image of N=A×B pixels by conventional means would require a redundant set of M=2AB masks. The new approach needs only M=A+B.

Figure 9:
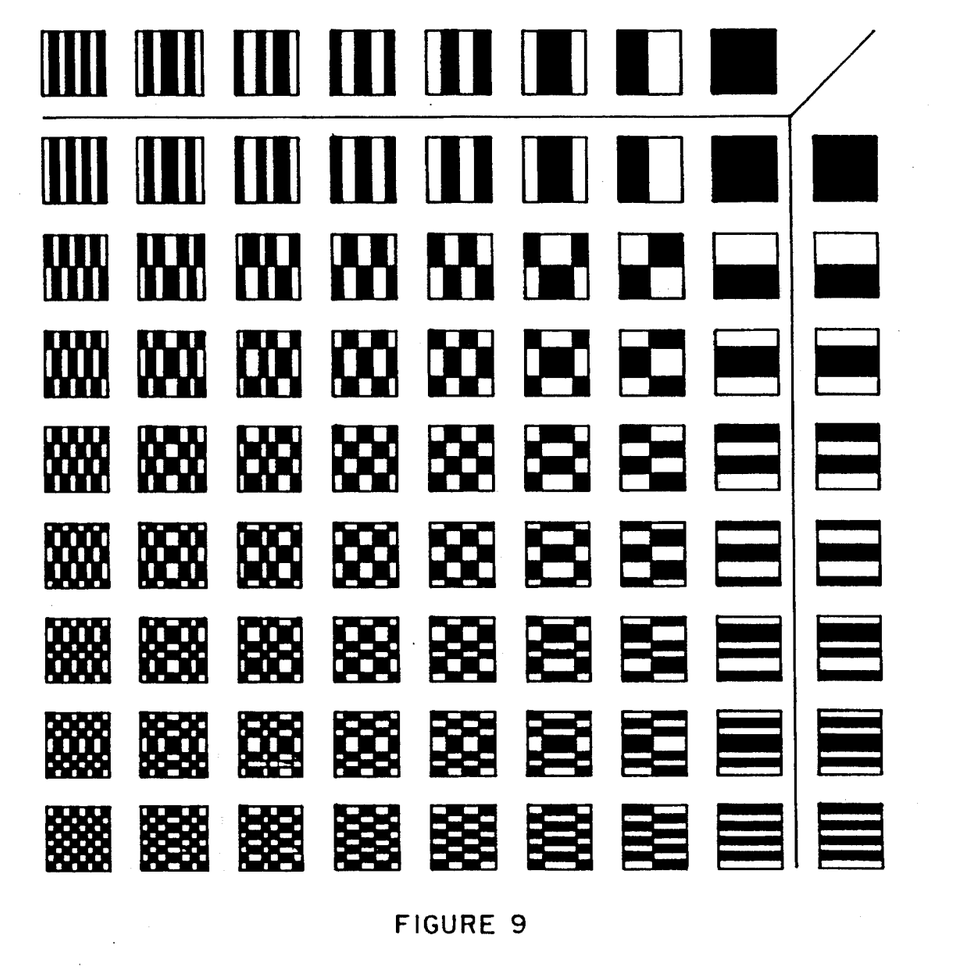
FIG. 9 shows an example of a Kronecker product table for Cartesian geometry.
Figure 10:
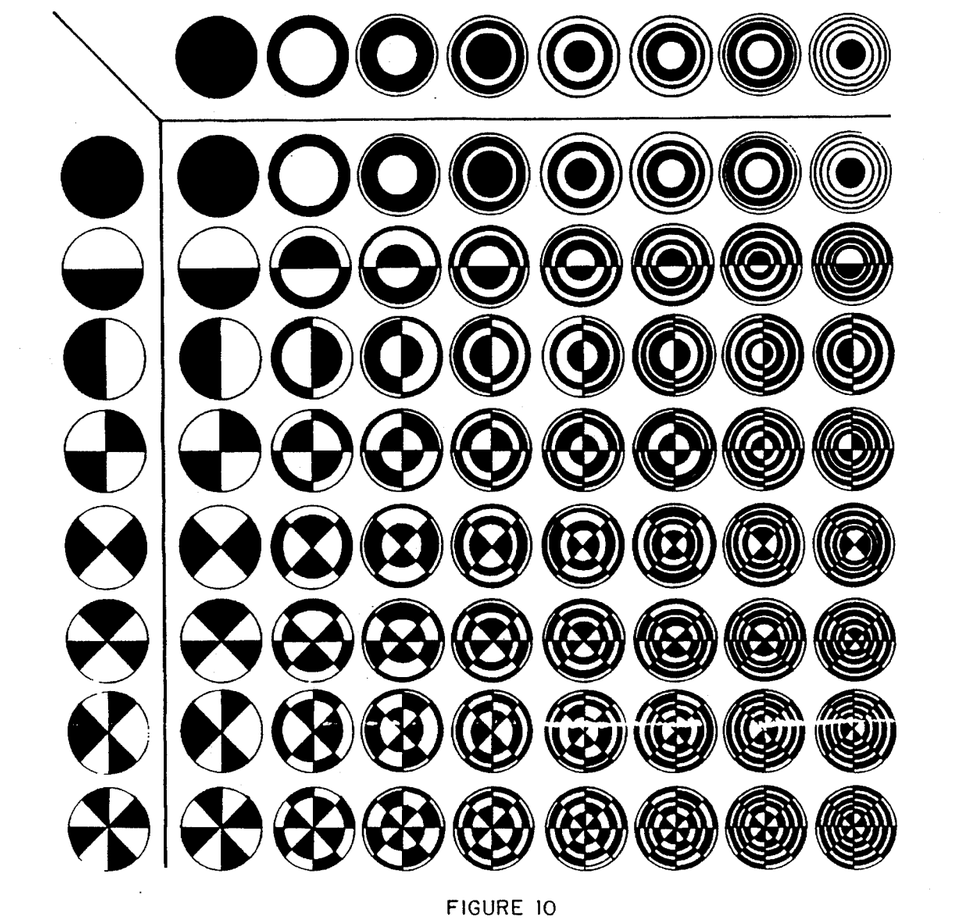
FIG. 10 shows an example of a Kronecker product table in modified polar coordinates.

A further clarification is provided by FIG. 9. As you look at the figure, imagine that the darkened areas are reflecting and the light areas are transmitting. Along the left margin of the figure you see an order 8 basis set of Walsh masks with their spatial modulations oriented along only one direction. These would comprise one of the two mask sets in FIG. 8. The second mask set is shown along the top margin of FIG. 9. This second set has its spatial modulations oriented perpendicular to the first set. The remainder of FIG. 9 comprises a Kronecker product table, showing what one of the instrument's optical detectors would perceive. The other detector would see the complement of these patterns, with its reflecting and transmitting regions interchanged. This Kronecker product mask synthesis approach is not confined to simple square or rectangular Cartesian arrays. As emphasized by Harmuth, a huge variety of geometries may be accommodated within the same conceptual framework. An example of another possible mask configuration is displayed in FIG. 10.

Except for inevitable system losses due to imperfect reflective coatings, absorptive substrates and detection inefficiencies, an instrument like the one shown in FIG. 8 will detect all of the incident radiation all of the time. At wavelengths where detection noise is the dominant detractor from overall instrumental performance, the new instrument is expected to exhibit the well-known multiplex advantage, just as FTS and HTS instruments do in spectroscopic applications. Unlike conventional multiplexing techniques, the new one utilizes more of the available radiation from the source by not selectively absorbing it in opaque regions of encoding masks.

First-order passive radiation background suppression is achieved by exactly the same means that have proven to be so successful in Fourier transform spectroscopy. Two input beams are employed (see FIG. 8). One samples the field of interest, while the other observes either a blank background or a calibrated thermal source. Because the two beams propagate through the instrument from opposite sides, any common-mode background signal shared by both inputs will not be modulated by the masks and will be subtracted out by the detector-differencing operation. In other words, the instrument will be sensitive only to the contrast between the two input beams, not to the absolute irradiance of the target alone. This should provide excellent ability to discriminate between weak targets and ambient thermal background radiation.

Locally generated instrumental background will be rejected by using a reflecting-transmitting chopper 120 (in FIG. 8) at the input, synchronized to a lock-in amplifier connected to the detectors. This will switch the image flux of interest rapidly between the two sides of the optical configuration, thereby modulating the target signal while not affecting the local background. Use of a lock-in will then pass signals only at the frequency and phase provided by the chopper, effectively suppressing the local background signal component. This technique is well known in the art of infrared optics. (See: Wilmhurst, "Signal Recovery", Ch.3, Adam Higler, N.Y., 1990)

The versatility of the approach manifests itself in the form of easy adaptation to a wide variety of applications. As FIGS. 9–10 indicate, the technique is virtually unrestricted in the geometric forms that it can accommodate. A practical instrument can be configured for optimal performance when observing almost any shape and size of target.

Its spatial resolutions along two independent coordinates are completely decoupled from each other. One or both may be modified in real time, in order to tailor the instrument to the observations at hand. The spatial frequencies (or, more accurately, spatial sequencies) that characterize the object under study may be altered over a wide range without altering the hardware configuration of the instrument. This sort of real-time adaptability has been proven to be of great utility in the contexts, such as field observations involving Fourier transform spectrometers.

When an instrument of this type is used to record a radiation image in real time, an observer will find that the image will develop on a monitor in an atypical fashion. Instead of appearing as a point-by-point or line-by-line scan, the scene will be built up by a convergent tiling procedure. Initial views will show only image information of low spatial sequency, although source flux from the entire field of view will be detected immediately. As different masks are cycled into place by the instrument's opto-mechanical servo system, ever finer spatial detail will appear within the scene, and, for weak sources, image signal-to-noise characteristics will continue to improve. Convergent tiling systems are of potential interest in several areas, including automated pattern recognition devices. [Welch, Computers in Physics 4, 645–649 (1990)] It is possible that the imaging approach disclosed here might find use in intelligent automated target identification systems.

Optical multiplexing techniques have been widely used in practical applications for only a quarter-century or so, since the advent of high resolution Fourier transform spectroscopy. Nevertheless, the intrinsic power and utility of multiplexing methods have proven themselves time and again, particularly when they are exploited in wavelength ranges where conventional one or two-dimensional array detector technology does not exist.

At near-infrared wavelengths (1.0 µm≦λ≦5.6 µm) the detector can be formed of indium antimonide. Each mask set can be formed on a disk of IR transmitting material, for example calcium fluoride or zinc selenide. The masks can be photo-etched into metallic or dielectric films formed on the disks. The films can be, for example, gold or aluminum. The two disks can be driven by a closed-loop servo system controlled from a computer program, as is well-known in the art. For a 64×64 pixel image there will be 64 masks on each disk.

The FIGS. 8 and 11 instrument has disks 140, 142, and 144 which, respectively, bear the chopper 120, mask 122, and mask 124 and which are each rotated by a conventionally represented servomotor 146. In FIG. 11, the disks corresponding to the masks are shown with a mask of each of the FIG. 9 margin mask sets disposed at a corresponding one of the mask positions 122 and 124, the positions of other masks of the one of the FIG. 9 sets corresponding to the position 122 being indicated by the numeral 152 and the positions of other masks of the other FIG. 9 set on disk 144 being indicated by the numeral 154. It is apparent that the servomotors for disks 142 and 144 are adapted to swap the masks of each set in any sequence into the corresponding mask positions 122 or 124.

FIGS. 8 shows a computer 160 receiving data indicated by arrow 162 from the difference amplifier 134, this data corresponding to the difference Pi' defined above in connection with FIG. 3. The computer has any suitable program for applying an inverse transform of the sequency functions of the mask sets to data 162 and to generate an image 164 by processing the data signals provided to the computer by detectors 126 and 128 via amplifier 134. As shown in FIGS. 8 and 11, computer 160 also sends control signals indicated by arrows 166 to each of the servomotors 146 for the above-described synchronization of the chopper 120 with a lock-in amplifier and for controlling and synchronizing rotation of the mask disks 142 and 144 so as to make all combinations of the set of masks on disk 142 with the set of masks on disk 144. It is evident that these disks and masks with their servomotors and with such computer synchronization are an opto-mechanical servo system for cycling different masks as set forth above.

In the middle-infrared (8.0 µm≦λ≦20.0 µm) the detectors would be made of mercury cadmium telluride. The general arrangement on disks could be the same except that ZnSe substrates might be used.

In the far-infrared to submillimeter range (100.0 µm≦λ≦1 mm) the detector could be a photfluxonic detector. (see: Kadin et al, "Photofluxonic Detection: A New Mechanism for Infrared Detection In Superconducting Thin Films," Appl.Phys. Lett. 57 (26), pp.2847–2849, 24 Dec., 1990). The masks could be formed in strips of back to back prisms of high refractive index material. To transmit the strips are clamped together in contact. To reflect, the strips are separated so that there is space between the backs. (See: Gunther, "Optics", p. 82, John Wiley & Sons, 1990)

In the microwave region, the chopper would be eliminated and conventional microwave detectors would be used. The telescope and mirrors could be, for example, microwave dishes. The masks could be formed as arrays of thin metallic slats on pivots at their ends (like venetian blinds) so that when turned edge-on to the radiation the radiation can pass but when turned perpendicular to the radiation the radiation will be reflected.

Figure 12:
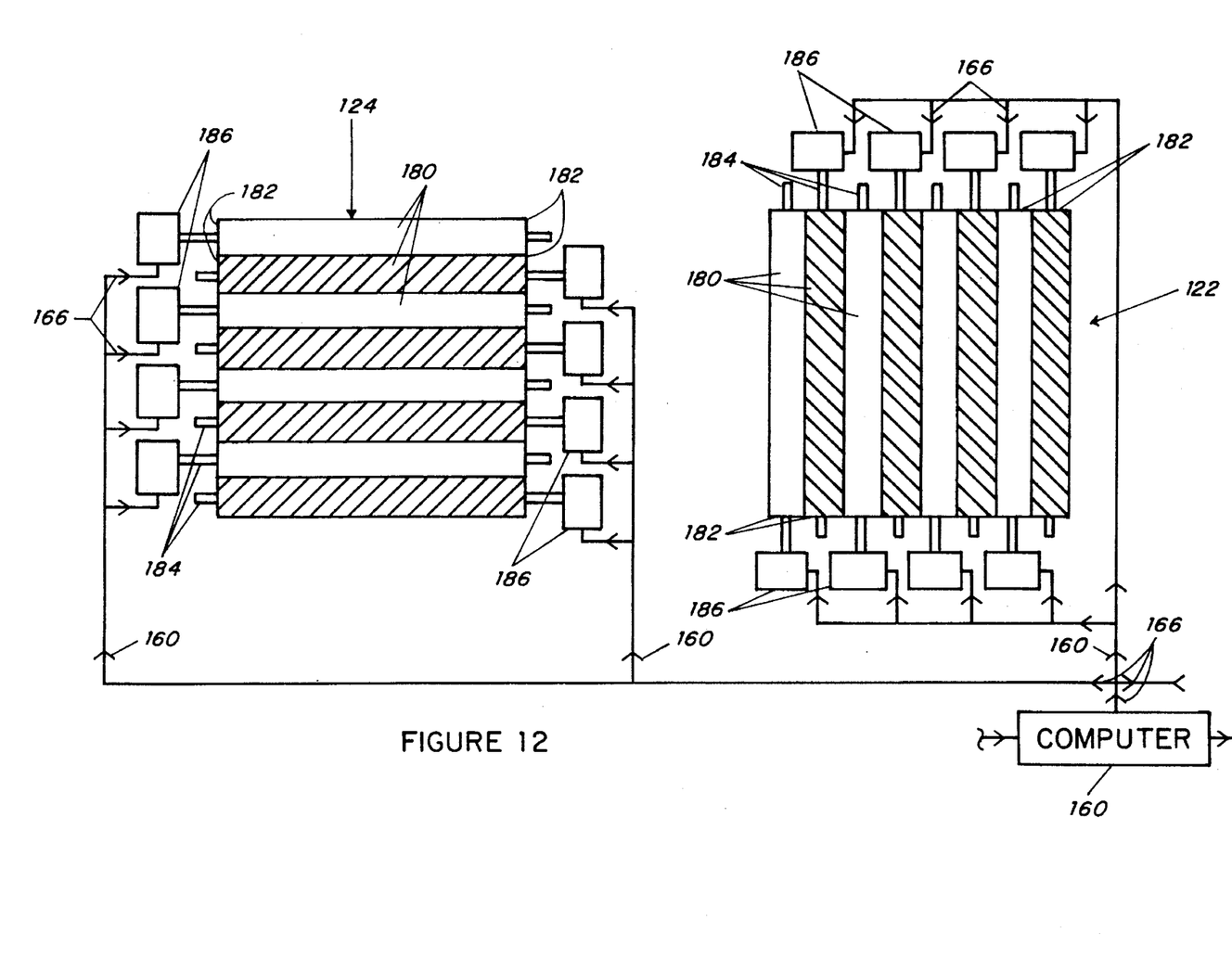
FIG. 12 shows two masks formed as shutters by slats or strips.

FIG. 12 shows a pair of such masks which are formed as shutters by such arrays of slats or strips 180 and which correspond to mask positions 122 and 124. Each slat has a pair of narrow ends 182 and each narrow end has a pivot 184 supported to any suitable manner, not shown. One of the pivots is connected to a conventionally represented servomotor 186 for rotation of the strip to pass or block radiation so that each array forms a shutter. The servomotors 186, like servomotors 156, receive computer and program generated signals 166 from a computer 160 for synchronization of servomotors 186 to form sets of masks, the masks depicted in FIG. 12 being those taken from FIG. 9 and shown in FIG. 11.

This invention is not limited to the preferred embodiment and alternatives heretofore described, to which variations and improvements may be made, without departing from the scope of protection of the present patent and true spirit of the invention, the characteristics of which are summarized in the following claims.

I claim:

1. An apparatus for forming an image of N pixels, comprising:

a first set of masks having patterns of complementary reflecting and transmitting regions based on sequency functions, there being $\sqrt{N}$ masks in said first set, a second set of masks having patterns of complementary reflecting and transmitting areas based on sequency functions, said second set being orthogonal to said first set, there being $\sqrt{N}$ masks in said second set, means for forming an image of a subject on a first mask position, means for swapping said first set of masks in sequence into said first mask position, means for focussing radiation reflected from a mask of said first set of masks in said first mask position onto a second mask position from a first direction, means for focussing radiation transmitted through a mask of said first set of masks in said first mask position onto said second mask position from a second direction, means for swapping said second set of masks in sequence into said second mask position, means for synchronizing said second means for swapping with said first means for swapping to make all combinations of said first set of masks with said second set of masks, first means for converting radiation into an electrical signal proportional to radiant energy flux, second means for converting radiation into an electrical signal proportional to radiant energy flux, means for focussing and redirecting radiation reflected from said first direction and transmitted from said second direction from a mask of said second set of masks in said second mask position onto said first means for converting energy into an electrical signal proportional to radiant energy flux, and means for focussing and redirecting radiation reflected from said second direction and transmitted from said first direction from a mask of said second set of masks in said second mask position onto said second means for converting energy into an electrical signal proportional to radiant energy flux.

2. The apparatus of claim 1 wherein said sequency functions are Walsh functions.

3. The imaging apparatus of claim 1 including means for separating a first incident beam of radiation from a subject to be imaged and a second beam from a reference source of background radiation into two non-parallel beams of radiation and two more means for focussing and redirecting radiation.

4. The imaging apparatus of claim 1 wherein said means for forming an image of a subject on said first mask position includes an alternately reflecting chopper and means for focusing and redirecting radiation from said chopper toward said first mask position.

5. An apparatus for forming an image of N pixels, comprising:

means for forming an image of a subject on a first plane, means for masking said image using a Kronecker product of two sets of $\sqrt{N}$, orthogonal, sequency function masks, detector means for converting radiation from said means for masking into an electrical signal proportional to radiant energy flux, and computer means for controlling said means for masking and for processing signals from said detector means into an image.

6. The apparatus of claim 4 wherein said sequency functions are Walsh functions.

7. An apparatus for forming an image of 4096 pixels, comprising:

a first set of masks having patterns of complementary reflecting and transmitting regions based on Walsh functions, there being 64 masks in said first set, said first set of masks being formed on a first disk of infrared transmitting material, a second set of masks having patterns of complementary reflecting and transmitting areas based on Walsh functions, said second set being orthogonal to said first set, there being 64 masks in said second set, said second set of masks being formed on a second disk of infrared transmitting material, servomotor means for rotating said disks, a first concave mirror for focusing radiation reflected from a mask of said first set onto a mask of said second set from a first direction, a second concave mirror for focusing radiation transmitted through the same mask of said first set onto the same mask of said second set from a second direction, a first radiation detector formed of indium antimonide, a second matched radiation detector formed of indium antimonide, a first lens, said first lens being a means for focussing radiation reflected from said first direction and transmitted from said second direction from a mask of said second set of masks onto said first radiation detector, and a second lens, said second lens being a means for focussing radiation reflected from said second direction and transmitted from said first direction from a mask of said second set of masks onto said second radiation detector, computer means for controlling said servomotor means for rotating said disks, including program means for making all combinations of said first set of masks with said second set of masks, and computer means for processing signals from said two radiation detectors to form an image.

8. The apparatus of claim 7 wherein said disks are formed of calcium fluoride.

9. The apparatus of claim 7 wherein said disks are formed of zinc selenide.

10. The apparatus of claim 7 wherein said masks are formed by photoetching thin films of aluminum formed on said disks.

11. The apparatus of claim 7 wherein said masks are formed by photoetching thin films of gold formed on said disks.

12. The apparatus of claim 1 which is configured for microwave frequencies where said first set of masks and said second set of masks are formed as shutters with narrow thin metallic strips having pivots mounted on their narrow ends and including means for rotating said strips to pass or block radiation.

13. The apparatus of claim 1 including a difference amplifier for taking the difference between signals from said first and second means for converting radiation into an electrical signal proportional to radiant energy flux.

14. The apparatus of claim 13 including computer and program means for applying an inverse transform of the sequency functions to data from said difference amplifier.

15. The apparatus of claim 14 wherein said sequency functions are Walsh functions.

16. The apparatus of claim 15 wherein said apparatus is configured for the near infrared and said first and second set of masks are formed by photoetching a thin films of reflective material formed on two disks of infrared transmitting material.

17. The apparatus of claim 16 wherein said reflective material is gold.

18. The apparatus of claim 17 wherein said disks are formed of calcium fluoride.

19. The apparatus of claim 17 wherein said first and second means for converting radiation into an electrical signal proportional to radiant energy flux are formed of indium antimonide.

20. The apparatus of claim 17 wherein said disks are formed of zinc selenide.

* * * * *